United States Patent [19]

Yamashita et al.

[11] Patent Number: 5,529,617

[45] Date of Patent: Jun. 25, 1996

[54] INK FOR INK JET RECORDING METHOD AND INK JET RECORDING USING SAME

[75] Inventors: Yoshiro Yamashita; Toshitake Yui; Eisuke Hiraoka; Ken Hashimoto; Yasuharu Endo, all of Minami-ashigara, Japan

[73] Assignee: Fuji Xerox Co., Ltd., Tokyo, Japan

[21] Appl. No.: 369,512

[22] Filed: Jan. 6, 1995

[30] Foreign Application Priority Data

Jan. 11, 1994 [JP] Japan .................................. 6-012277

[51] Int. Cl.$^6$ ..................................... C09D 11/02
[52] U.S. Cl. .................... 106/20 R; 106/20 D; 106/22 R
[58] Field of Search ................. 106/20 R, 22 R, 106/20 D

[56] References Cited

U.S. PATENT DOCUMENTS

| | | | |
|---|---|---|---|
| 4,388,115 | 6/1983 | Sugiyama et al. | 106/22 K |
| 4,446,470 | 5/1984 | Sugiyama et al. | 346/140 R |
| 4,923,515 | 5/1990 | Koike et al. | 106/22 R |
| 4,986,850 | 1/1991 | Iwata et al. | 106/22 F |
| 5,100,469 | 3/1992 | Pontes et al. | 106/20 D |
| 5,395,434 | 3/1995 | Tochihara et al. | 106/22 H |

FOREIGN PATENT DOCUMENTS

| | | |
|---|---|---|
| 51-85804 | 7/1976 | Japan . |
| 53-61412 | 6/1978 | Japan . |
| 55-65268 | 5/1980 | Japan . |
| B2-60-34992 | 8/1985 | Japan . |
| 61-55546 | 3/1986 | Japan . |
| B2-61-36876 | 8/1986 | Japan . |
| 62-13388 | 1/1987 | Japan . |
| 62-28828 | 2/1987 | Japan . |
| 1-263169 | 10/1989 | Japan . |
| 51-17712 | 1/1993 | Japan . |

*Primary Examiner*—Helene Klemanski
*Attorney, Agent, or Firm*—Oliff & Berridge

[57] ABSTRACT

A novel ink for ink jet recording, comprising water, a coloring material, a high molecular surface active agent and a sulfur-containing alcohol; and an ink for ink jet recording method using the ink which causes neither nozzle clogging nor disturbance of jetting and can provide a high density uniform image that can be easily dried on ordinary paper.

17 Claims, No Drawings

INK FOR INK JET RECORDING METHOD AND INK JET RECORDING USING SAME

FIELD OF THE INVENTION

The present invention relates to a novel ink for ink jet recording method for use with an ink jet recording apparatus. More particularly, the present invention relates to an ink jet recording method using such an ink.

BACKGROUND OF THE INVENTION

Because of its advantages such as small size, inexpensiveness and noise-free operation, a so-called ink jet recording apparatus which is adapted to jet a liquid or molten solid ink through a nozzle, slit, porous film or the like against paper, cloth, film or the like to effect recording has been extensively studied. In particular, many monochromatic printers capable of recording on so-called ordinary paper such as report blank form and duplicating paper are commercially available. In recent years, printers capable of recording in all colors have been marketed.

An ink for use in these ink jet recording apparatus is mainly composed of a solvent, a coloring material and additives.

An ink for ink jet recording method has the following requirements:
(1) It must provide a high resolution, high density uniform image on paper without blurring or fogging;
(2) When dried at the tip of the nozzle, it must cause no nozzle clogging, providing invariably good jetting response and stability;
(3) It must be easily dried on paper;
(4) It must provide an image with a good fastness;
(5) It must have a good storage stability.

As an approach for obtaining a high density uniform image on ordinary paper there has been heretofore proposed the combined use of C. I. direct black 168 as a dye and thiodiglycol (JP-A-1-263169 (the term "JP-A" as used herein means an "unexamined published Japanese patent application")). As an approach for improving the dryability of the ink on paper there has been proposed the addition of a surface active agent or polyvalent alcohol derivative (JP-B-60-34992 (the term "JP-B" as used herein means an "examined Japanese patent publication") and JP-B-62-13388). As an approach for preventing nozzle clogging there has been proposed the chelation of metallic ions with a chelating agent (JP-A-51-85804). In order to enhance the solubility of dyes, a method has been proposed which comprises the use of N-methyl-2-pyrrolidone, thiodiethanol, ethanolamine or the like as a solubilizing agent (JP-B-61-36876, JP-B-61-55546, JP-B-62-28828). Referring to jetting stability, it is thought that air dissolved in the ink foams, disturbing the jetting direction or disabling jetting. The addition of an oxygen absorbent has been proposed (JP-A-53-61412). Further, the addition of an anti-foaming agent has been proposed (JP-A-55-65268). Moreover, a method has been proposed which comprises the deaeration of the ink to inhibit foaming (JP-A-5-17712).

As mentioned above, many approaches for improving image uniformity, dryability on paper, anti-clogging properties and jetting stability have been proposed. However, none of these approaches can fully satisfy all the requirements.

SUMMARY OF THE INVENTION

It is therefore an object of the present invention to provide an ink for ink jet recording method which causes neither nozzle clogging nor disturbance of jetting and can provide a high density uniform image that can be easily dried on ordinary paper.

It is another object of the present invention to provide a recording method capable of providing a high density uniform image with an invariably good jetting response and jetting stability free from nozzle clogging.

These and other objects of the present invention will become more apparent from the following detailed description and examples.

As a result of extensive studies, the inventors found that the addition of a high molecular surface active agent and a sulfur-containing alcohol to an ink for ink jet recording method comprising water and a coloring material as essential components makes it possible to provide a high density uniform image which can be easily dried on ordinary paper and prevent nozzle clogging or disturbance of jetting. Thus, the present invention has been worked out.

The foregoing objects of the present invention are accomplished with an ink for ink jet recording method comprising water and a coloring material as essential components, characterized in that a high molecular surface active agent and a sulfur-containing alcohol are contained therein.

The foregoing objects of the present invention are also accomplished by an ink jet recording method, which comprises jetting the foregoing ink at a drop of not more than 100 ng to effect recording.

The inventors found that the incorporation of a high molecular surface active agent and a sulfur-containing alcohol provides improved head cleaning properties. An ink jet nozzle comprises a number of nozzle apertures arranged linearly on the head end face. When ink jet recording is effected, scattered or effluent ink is attached to the vicinity of the nozzle apertures on the head end face. When the ink is accumulated, it causes a disturbance of jetting direction. Therefore, the head end face is wiped by a wiper member at regular intervals. However, when scattered ink is allowed to stand in the atmosphere to cause water to be evaporated, the ink viscosity is raised, making it difficult to cause the scattered ink to move to the wiper member even when cleaning is in operation. Thus, the head cannot be sufficiently cleaned, leaving the scattered ink remained. As a result, the direction of ink jetting is left disturbed. On the other hand, the ink of the present invention has a minimized water evaporation and thus suffers from a minimized viscosity rise even when allowed to stand in the atmosphere. Accordingly, the ink of the present invention provides very good head cleaning properties. As a result, even when the number of ink jetting pulses is increased, the direction of ink jetting is not disturbed. This is possibly because that the ink of the present invention exhibits a minimized viscosity change as well as a low surface tension and thus can be moved to the wiper member. The addition of a low molecular surface active agent and a sulfur-containing alcohol provides good results of head cleaning test but causes some problems in image quality and jetting stability tests.

DETAILED DESCRIPTION OF THE INVENTION

The present invention will be further described hereinafter.

The high molecular surface active agent of the present invention generally has a weight average molecular weight of 1,000 or more, preferably from 1,000 to 10,000. Examples of the high molecular surface active agent to be incorporated in the ink for ink jet recording method of the present invention include Pluronic type nonionic surface active agent (i.e., polyoxyethylene polyoxypropylene block copolymer), sodium naphthalene sulfonate formaldehyde condensate, sodium polystyrene sulfonate, sodium polyacrylate, carboxymethylcellulose, polyvinyl alcohol, polyalkyl methacrylate, copolymer of alkyl methacrylate with amine-containing monomer, and polyacrylamide and derivative thereof. Most preferred among these high molecular surface active agents is polyoxyethylene polyoxypropylene block copolymer, taking into account the image uniformity and dryability and ink nonfoamability. The polyoxyethylene polypropylene block copolymer of the present invention is preferably represented by formula (1) or (2)

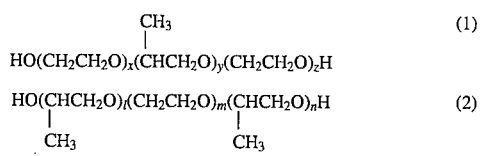

wherein x, y, z, l, m, and n each represents an integer. The block copolymer preferably has an average molecular weight of from 1,000 to 5,100, and more preferably from 2,000 to 5,000, and the oxyethylene portion accounts for 5 to 60%, preferably 20 to 50%, of the average molecular weight of the block copolymer. (This value is referred to an "oxyethylene content" in the Examples) Further, the oxypropylene portion of the block copolymer generally has an average molecular weight of from 900 or more, preferably from 900 to 5,000, more preferably from 1,500 to 2,500, and most preferably from 1,800 to 2,000. (This value is referred to as "oxypropylene block molecular weight" in the Examples.) The content of the oxyethylene portion is calculated from the difference between the amount of the corresponding monomer charged at the copolymerization and the amount of the monomer non-polymerized and remained after the copolymerization. The block copolymer may be used independently or as a mixture thereof. When used as a mixture, the content of the oxyethylene portion in each block copolymer need not account for 5 to 60% of the average molecular weight of the respective block copolymer as long as the content of the oxyethylene portion as a whole of the admixed block copolymers is fallen within the range.

Incorporation of the high molecular surface active agent in the ink facilitates the penetration of the ink into paper and thus speeds the drying of the ink while inhibiting the excess diffusion of the ink in paper to prevent the ink from blurring on paper as in the case of ordinary surface active agents. The high molecular surface active agent is preferably incorporated in the ink in an amount of 0.01 to 10% by weight, more preferably 0.05 to 5% by weight based on the total weight of the ink (including optional components if any).

The sulfur-containing alcohol to be used in combination with the foregoing high molecular surface active agent is a hydroxyl-substituted sulfide or mercaptan and is represented by formula (3)

wherein $R^1$ and $R^2$ each represents a hydrogen atom, a hydroxy group, or an alkyl group preferably having 1 to 5 carbon atoms which may be substituted by a hydroxy group, provided that $R^1$ and $R^2$ are not a hydrogen atom at the same time.

Specific examples of the hydroxyl-substituted sulfide or mercaptan include thiodiethanol $(HOCH_2CH_2SCH_2CH_2OH)$, 2-mercaptoethanol $(HOCH_2CH_2SH)$, thioglycerol $(HOCH_2CH(OH)CH_2SH)$, monothiopropylene glycol $(HSCH_2CH_2CH_2OH)$, 2-methylthioethanol $(CH_3SCH_2CH_2OH)$, and 3-hydroxypropylmethyl sulfide $(CH_3SCH_2CH_2CH_2OH)$. If the sulfur-containing alcohol itself exhibits a high viscosity or exerts a reduced effect of inhibiting evaporation of water, the resulting effect of eliminating nozzle clogging is reduced. Further, if the sulfur-containing alcohol exhibits a high volatility, it causes an odor problem. In this respect, thiodiethanol is most preferred. The content of the sulfur-containing alcohol in the ink (including optional components if any) is preferably in the range of about 1 to 50% by weight, more preferably about 3 to 30% by weight.

If such a high molecular surface active agent alone is incorporated in the ink, it provides improvements in the image uniformity and dryability but can easily cause a rapid rise in the viscosity of the ink when water is evaporated at the tip of the ink jet nozzle, possibly clogging the nozzle. Further, such a high molecular surface active agent is less foamable than ordinary surface active agents but is not completely nonfoamable. It is likely that the high molecular surface active agent is foamed in the nozzle, disturbing the jetting direction. The incorporation of the sulfur-containing alcohol in the ink in combination with the high molecular surface active agent not only inhibits the nozzle clogging but also further eliminates foaming, making it possible to reduce the disturbance of jetting.

As the coloring material to be incorporated as an essential component in the ink for ink jet recording method of the present invention there may be used dye, pigment, colored polymer, colored wax or the like. Among these coloring materials, a water-soluble dye is preferred. Preferred examples of such a water-soluble dye include acidic dyes, direct dyes, basic dyes, and reactive dyes. More preferred among these dyes are acidic dyes and direct dyes. Examples of these acidic dyes and direct dyes include C. I. direct black 2, C. I. direct black 4, C. I. direct black 9, C. I. direct black 11, C. I. direct black 17, C. I. direct black 19, C. I. direct black 22, C. I. direct black 32, C. I. direct black 80, C. I. direct black 151, C. I. black 154, C. I. direct black 168, C. I. direct black 171, C. I. direct black 194, C. I. direct blue 1, C. I. direct blue 2, C. I. direct blue 6, C. I. direct blue 8, C. I. direct blue 22, C. I. direct blue 34, C. I. direct blue 70, C. I. direct blue 71, C. I. direct blue 76, C. I. direct blue 78, C. I. direct blue 86, C. I. direct blue 112, C. I. direct blue 142, C. I. direct blue 165, C. I. direct blue 199, C. I. direct blue 200, C. I. direct blue 201, C. I. direct blue 202, C. I. direct blue 203, C. I. direct blue 207, C. I. direct blue 218, C. I. direct blue 236, C. I. direct blue 287, C. I. direct red 1, C. I. direct red 2, C. I. direct red 4, C. I. direct red 8, C. I. directed red 9, C. I. direct red 11, C. I. direct red 13, C. I. direct red 15, C. I. direct red 20, C. I. direct red 28, C. I. direct red 31, C. I. direct red 33, C. I. direct red 37, C. I. direct red 39, C. I. direct red 51, C. I. direct red 59, C. I. direct red 62, C. I. direct red 63, C. I. direct red 73, C. I. direct red 75, C. I. direct red 80, C. I. direct red 81, C. I. directed red 83, C. I. direct red 87, C. I. direct red 90, C. I. direct red 94, C. I. direct red 95, C. I. direct red 99, C. I. direct red 101, C. I. direct red 110, C. I. direct red 189, C. I. direct yellow 1, C. I. direct yellow 2, C. I. direct yellow 4, C. I. direct yellow 8, C. I. direct yellow 11, C. I. direct yellow 12, C. I. direct yellow 26, C. I. direct yellow 27, C. I. direct yellow 28, C. I. direct yellow 33, C. I. direct yellow 34, C. I. direct yellow 41, C. I. direct yellow 44, C. I. direct yellow 48, C. I. direct yellow 58, C. I. direct yellow 86, C. I. directed yellow 87, C. I. direct yellow 88, C. I. direct yellow 135, C. I. direct yellow 142, C. I. direct yellow 144, C. I. food black 1, C. I. food black 2, C. I. acid black 1, C. I. acid black 2, C. I. acid black 7, C. I. acid black 16, C. I. acid black 24, C. I. acid black 26, C. I. acid black 28, C. I. acid black 31, C. I. acid black 48, C. I. acid black 52, C. I. acid black 63, C. I. acid black 107, C. I. acid black 112, C. I. acid black 118, C. I. acid black 119, C. I. acid black 121, C. I. acid black 156, C. I. acid black 172, C. I. acid black 194, C. I. acid black 208, C. I. acid blue 1, C. I. acid blue 7, C. I. acid blue 9, C. I. acid blue 15, C. I. acid blue 22, C. I. acid blue 23, C. I. acid blue 27, C. I. acid blue 29, C. I. acid blue 40, C. I. acid blue 43, C. I. acid blue 55, C. I. acid blue 59, C. I. acid blue 62, C. I. acid blue 78, C. I. acid blue 80, C. I. acid blue 81, C. I. acid blue 83, C. I. acid blue 90, C. I. acid blue 102, C. I. acid blue 104, C. I. acid blue 111, C. I. acid blue 185, C. I. acid blue 249, C. I. acid blue 254, C. I. acid red 1, C. I. acid red 4, C. I. acid red 8, C. I. acid red 13, C. I. acid red 14, C. I. acid red 15, C. I. acid red 18, C. I. acid red 21, C. I. acid red 26, C. I. acid red 35, C. I. acid red 37, C. I. acid red 110, C. I. acid red 144, C. I. acid red 180, C. I. acid red 249, C. I. acid red 257, C. I. acid yellow 1, C. I. acid yellow 3, C. I. acid yellow 4, C. I. acid yellow 7, C. I. acid yellow 11, C. I. acid yellow 12, C. I. acid yellow 13, C. I. acid yellow 14, C. I. acid yellow 18, C. I. acid yellow 19, C. I. acid yellow 23, C. I. acid yellow 25, C. I. acid yellow 34, C. I. acid yellow 38, C. I. acid yellow 41, C. I. acid yellow 42, C. I. acid yellow 44, C. I. acid yellow 53, C. I. acid yellow 55, C. I. acid yellow 61, C. I. acid yellow 71, C. I. acid yellow 76, C. I. acid yellow 78, C. I. acid yellow 79, and C. I. acid yellow 122. These dyes may be used singly. Alternatively, two or more of these dyes may be used. Besides four primaries, i.e., cyan, magenta, yellow and black, these dyes may be toned to custom colors such as red, blue and green.

Further, pigments may be used. For example, carbon black, brilliant carmine BS, lake carmine FB, brilliant fast scarlet, disazo yellow, permanent red R, fast yellow 10G, phthalocyanine blue, blue lake, yellow lake, rhodamine lake, etc. may be used.

The content of these coloring materials is preferably in the range of 0.1 to 20% by weight, more preferably 1 to 10% by weight based on the total weight of the ink. If the content of the coloring materials exceeds the above defined range, it worsens the nozzle clogging when water is evaporated at the tip of the nozzle. On the contrary, if the content of the coloring materials falls below the above define range, it goes without saying that a sufficient density cannot be obtained.

The ink of the present invention may contain other additives as optional components. For example, in order to inhibit the evaporation of water, a water-soluble organic solvent may be used. Specific examples of such a water-soluble organic solvent include polyvalent alcohols such as ethylene glycol, diethylene glycol, propylene glycol, polyethylene glycol, triethylene glycol and glycerin, glycol ethers such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether and propylene glycol monobutyl ether, and basic solvents such as pyrrolidone, N-methyl-2-pyrrolidone and triethanolamine. These water-soluble organic solvents may be used singly or in admixture. The content of the water-soluble organic solvent is preferably in the range of about 1 to 60% by weight, more preferably about 5 to 40% by weight based on the total weight of the ink, and 10 times or less, preferably 5 times or less that of the sulfur-containing alcohol. If the content of the water-soluble organic solvent exceeds the above defined range, it not only causes a rise in the ink viscosity that reduces the jetting stability but also causes deterioration of the effects of the sulfur-containing alcohol, i.e., inhibiting nozzle clogging and improving ink nonfoamability.

In order to further stabilize the dissolution or dispersion of dyes or pigments, a low molecular surface active agent may be incorporated in the ink. As such a surface active agent there may be used a nonionic, anionic, cationic or amphoteric surface active agent. Examples of the nonionic surface active agent employable in the present invention include polyoxyethylene nonyl phenyl ether, polyoxyethylene octyl phenyl ether, polyoxyethylene dodecyl phenyl ether, polyoxyethylene alkyl ether, polyoxyethylenealiphatic ester, sorbitanaliphatic ester, polyoxyethylenesorbitanaliphatic ester, and aliphatic alkylolamide. Examples of the anionic surface active agent employable in the present invention include alkylbenzenesulfonate, alkylphenylsulfonate, alkylnaphthalenesulfonate, higher aliphatic acid salt, sulfuric ester salt of high aliphatic ester, sulfonate of higher aliphatic ester, sulfuric ester salt of higher alcohol ether, sulfonate of higher alcohol ether, and higher alkylsulfosuccinate. Examples of the cationic surface active agent employable in the present invention include primary, secondary and tertiary amine salts, and quaternary ammonium salt. Examples of the amphoteric surface active agent employable in the present invention include betaine, sulfobetaine, and sulfate betaine. The amount of the surface active agent to be added is predetermined such that the effects of the high molecular surface active agent cannot be inhibited, preferably twice or less, more preferably not more than equal to that of the high molecular surface active agent.

Further, urea, acetamide or the like may be incorporated in the ink as a solubilizing agent. The ink may further contain, as a pH adjustor, an acid such as hydrochloric acid, sulfuric acid, nitric acid, acetic acid and citric acid, a base such as sodium hydroxide, potassium hydroxide and ammonia, or a buffer such as phosphate, oxalate and amine salt. Moreover, the ink may contain, as a physical property adjustor, a polyethyleneimine, polyamine, polyvinyl pyrrolidone, polyethylene glycol, cellulose derivative or the like. The ink may further contain, as an inclusion compound, cyclodextrin, macrocyclic amine, crown ether or the like. The ink may contain a fungicide as necessary.

The ink of the present invention generally has a viscosity of 10 cp or less, preferably from 1 to 5 cp, and a surface tension of from 20 to 70 dyne/cm, preferably from 25 to 50 dyne/cm.

Since the ink of the present invention comprises a high molecular surface active agent and a sulfur-containing alcohol, it causes neither nozzle clogging nor disturbance of jetting and can provide a high density uniform image which can be easily dried on ordinary paper.

Ink jet recording of the present invention can be carried out by an ordinary method. Desirable results can be obtained particularly when a high resolution small drop ink jet recording method is effected at a drop amount of not more than 100 ng, preferably not more than 80 ng, more preferably not more than 60 ng. The term "drop amount" is an amount of ink discharged once from one nozzle of the ink jet head. The drop amount is predominantly determined by the specific gravity of ink, the nozzle volume, the ink jetting force, the ink viscosity and the ink surface tension, but primarily by the nozzle volume. In ink jet recording, the drop amount is preferably set within the range of 50 to 100 ng for 300 dpi (dot per inch) resolution when an ink having a viscosity of 10 cp or less and a surface tension of 20 to 70 dyne/cm is used. For the higher resolution (e.g., 600 dpi resolution), the drop amount is preferably set to less than 50 ng (e.g., about 30 ng or less). The ink of the present invention can be effectively applied for recording at the resolution of 300 dpi or higher, and preferably 600 dpi or higher.

The ink jet recording method of the present invention can provide improvements in the foregoing properties attributable to the incorporation of a high molecular surface active agent and a sulfur-containing alcohol without suffering from any conventional effect of nozzle clogging or ink foaming on image quality even if the discharge of the ink is small. In a recording system wherein a recording material is heated upon typing, too, the ink of the present invention can provide a good image quality.

The ink for ink jet recording of the present invention comprising water and a coloring material as essential components and a high molecular surface active agent and a sulfur-containing alcohol causes little nozzle clogging or foaming and hence no disturbance of jetting and can provide a high density uniform image which can be easily dried on ordinary paper. The mechanism of acceleration of penetration of the ink into paper along with suppression of excess diffusion of the ink in paper and blurring of the ink on paper due to the incorporation of the high molecular surface active agent has not yet been thoroughly made clear. The presumed mechanism is as follows. The high molecular surface active agent forms a stable surface layer in the vicinity of the surface of ink droplets to reduce the surface tension thereof and hence accelerate penetration of the ink into paper. On the other hand, since the high molecular surface active agent is a high molecular compound which can easily entangle itself in the components in the paper or increases its viscosity when water is evaporated, it suppresses excess diffusion of the ink in the paper. Further, the mechanism of the inhibition of nozzle clogging due to the incorporation of a sulfur-containing alcohol has not yet been made clear. A presumed mechanism is as follows. When water is evaporated at the tip of the nozzle, the sulfur-containing alcohol inhibits the reduction of the dissolution or dispersion stability of coloring material as well as high molecular surface active agent. Further, as compared with water-soluble organic solvents free of sulfur, the sulfur-containing alcohol has sulfur participation or weak interactions such as hydrogen bond to the high molecular surface active agent and thus slightly suppresses the rise in the ink viscosity, inhibiting nozzle clogging. The effect of eliminating foaming may be greatly attributable to the same defoaming effect as exerted by ordinary lower alcohols.

The present invention will be further described in the following examples and comparative examples, but the present invention should not be construed as being limited thereto. All "parts" are by weight unless otherwise indicated.

EXAMPLE 1

| | |
|---|---|
| C. I. acid blue 9 | 2 parts |
| Polyoxyethylene polyoxypropylene block copolymer of formula (1) (oxypropylene block molecular weight: about 1,800; oxyethylene content: about 40%; average molecular weight: about 3,000) | 2 parts |
| Thiodiethanol | 20 parts |
| Pure water | 80 parts |

These components were thoroughly mixed to make a solution. The solution was then filtered through a 0.45-μm filter under pressure to prepare an ink. The ink thus prepared had a viscosity of 2.3 mPas, a surface tension of 35 mN/m and a drop amount of 80 ng.

EXAMPLE 2

| | |
|---|---|
| C. I. acid blue 9 | 2 parts |
| Polyoxyethylene polyoxypropylene block copolymer of formula (1) (oxypropylene block molecular weight: about 1,000; oxyethylene content: about 10%; average molecular weight: about 1,100) | 1 parts |
| Thiodiethanol | 15 parts |
| Pure water | 85 parts |

These components were thoroughly mixed to make a solution. The solution was then filtered through a 0.45-μm filter under pressure to prepare an ink. The ink thus prepared had a viscosity of 2.0 mPas, a surface tension of 35 mN/m and a drop amount of 75 ng.

COMPARATIVE EXAMPLE 1

| | |
|---|---|
| C. I. acid blue 9 | 2 parts |
| Sodium dodecylsulfoante | 1 part |
| Thiodiethanol | 20 parts |
| Pure water | 80 parts |

These components were thoroughly mixed to make a solution. The solution was then filtered through a 0.45-μm filter under pressure to prepare an ink. The ink thus prepared had a viscosity of 2.0 mPas, a surface tension of 36 mN/m and a drop amount of 80 ng.

COMPARATIVE EXAMPLE 2

| | |
|---|---|
| C. I. acid blue 9 | 2 parts |
| Polyoxyethylene polyoxypropylene block copolymer of formula (1) (oxypropylene block molecular weight: about 3,000; oxyethylene content: about 50%; average molecular weight: about 6,000) | 2 parts |
| Glycerin | 20 parts |
| Pure water | 80 parts |

These components were thoroughly mixed to make a solution. The solution was then filtered through a 0.45-μm filter under pressure to prepare an ink. The ink thus prepared had a viscosity of 2.6 mPas, a surface tension of 37 mN/m and a drop amount of 73 ng.

COMPARATIVE EXAMPLE 3

| | |
|---|---|
| C. I. acid blue 9 | 2 parts |
| Thiodiethanol | 20 parts |
| Pure water | 80 parts |

These components were thoroughly mixed to make a solution. The solution was then filtered through a 0.45-μm filter under pressure to prepare an ink. The ink thus prepared had a viscosity of 2.0 mPas, a surface tension of 56 mN/m and a drop amount of 85 ng.

Evaluation of ink

The inks of Examples 1 and 2 and Comparative Examples 1 to 3 were evaluated as follows. The results are set forth in Table 1.

(1) Ink surface tension

The ink surface tension was measured by means of a Wilhelmy's tensiometer in an atmosphere of 23 ° C. and 55% RH.

(2) Ink viscosity

The ink viscosity was measured at a shear rate of 1,400 $s^{-1}$ in an atmosphere of 23° C. and 55% RH.

(3) Ink drop amount

The ink was jetted through a recording head in such a manner that 32 dot lines (2035 pulses) were formed five times at a frequency of 4.5 KHz in an atmosphere of 23° C. and 55% RH. The ink thus jetted was received by a small piece of bemcot (made of cloth). The discharged ink amount per pulse was then calculated.

(4) Image quality test

The ink prepared was subjected to typing test on FX-L paper (available from Fuji Xerox Co., Ltd.) as a representative ordinary paper using a thermal ink jet printer having a resolution of 300 dpi made on an experimental basis for evaluation. The properties to be evaluated were density and uniformity of image solid, blurring and uniformity of line image. The criteria of evaluation was as follows:

E . . . Excellent
F . . . Acceptable
P . . . Poor (5) Anti-clogging property test The ink prepared was jetted using a thermal ink jet printer having a resolution of 300 dpi made on an experimental basis for evaluation. Jetting was then suspended. The printer was then allowed to stand at a temperature of 23° C. and 55% RH with the nozzle uncapped. Jetting was then resumed. The minimum length of suspension after which image disturbance occurs was determined. The criteria of evaluation was as follows:

E . . . Not less than 10 min.
F . . . 5 min. to 10 min.
P . . . Less than 5 min.

(6) Jetting stability test

The ink prepared was packed into an ink cartridge made on an experimental basis. The ink cartridge was allowed to stand at a temperature of 10° C. for 1 week, and then at a temperature of 40° C. for 1 week. When the ink cartridge was returned to an atmosphere of 20° C., it was observed for generation of foams. The ink was then continuously jetted against 50 sheets of A4 papers using the thermal ink jet printer having a resolution of 300 dpi. During this jetting process, image disturbance was evaluated according to the following criteria:

E . . . Neither foaming nor white mark on image
F . . . Foaming slightly observable by naked eye, less than 5% defects such as white mark on image
P . . . Foaming apparently observable by naked eye, not less than 5% defects such as white mark on image (7) Dryability test A 40 mm×10 mm solid image was printed on FX-L paper (available from Fuji Xerox Co., Ltd.) as an ordinary paper. A coat paper for ink jet was then laminated on the printed paper under pressure. The length of lamination time after which the transfer of ink to the coat paper ends was determined. The evaluation was made according to the following criteria:

E . . . Not more than 60 sec.
F . . . 60 to 120 sec.
P . . . Not less than 120 sec.

(8) Head cleaning test

The jetting face of the ink jet head was cleaned every printing of one sheet. After 500 sheets of printing, the head was observed for stain on the nozzle face.

E . . . No stain on nozzle face
F . . . Slight stain on nozzle face
P . . . Stain on nozzle face, disturbance of jetting direction confirmed on print (9) Viscosity of aged ink Change in viscosity of the ink was measured before and after evaporation of 60% of water in the ink. The lower viscosity after the evaporation is better and the smaller change is better.

TABLE 1

|  | Examples | | Comparative Examples | | |
|---|---|---|---|---|---|
|  | 1 | 2 | 1 | 2 | 3 |
| image quality test | E | E | P | E | P |
| anti-clogging test | E | E | F | P | E |
| jetting stability test | E | E | P | P | E |
| dryability test | E | E | E | E | P |
| head cleaning test | E | E | E | F | P |
| viscosity of aged ink |  |  |  |  |  |
| Initial viscosity (mPas) | 2.3 | 2.0 | 2.0 | 2.6 | 2.0 |
| Viscosity after 60% water-evaporation (mPas) | 7.4 | 6.4 | 7.5 | 9.8 | 7.5 |
| Change in viscosity (mPas) | 5.1 | 4.4 | 5.5 | 7.2 | 5.5 |

EXAMPLE 3

| C. I. direct black 168 | 3 parts |
|---|---|
| Thiodiethanol | 15 parts |
| Polyoxyethylene polyoxypropylene block copolymer of formula (1) (oxypropylene block molecular weight: about 2,000; oxyethylene content: about 50%; average molecular weight: about 4,000) | 1 parts |
| Pure water | 80 parts |

These components were thoroughly mixed to make a solution. The solution was then filtered through a 0.45-μm filter under pressure to prepare an ink. The ink thus prepared exhibited a viscosity of 2.1 mPas, a surface tension of 36 mN/m and a drop amount of 76 ng. The results of image quality test, jetting stability test, anti-clogging test, dryability test and head cleaning test were all excellent.

EXAMPLE 4

| C. I. direct yellow 144 | 3 parts |
|---|---|
| Glycerin | 10 parts |
| Thiodiethanol | 10 parts |
| Polyoxyethylene polyoxypropylene block copolymer of formula (1) (oxypropylene block molecular weight: about 1,000; oxyethylene content: about 35%; average molecular weight: about 1,550) | 1 parts |

These components were thoroughly mixed to make a solution. The solution was then filtered through a 0.45-μm filter under pressure to prepare an ink. The ink thus prepared exhibited a viscosity of 2.4 mPas, a surface tension of 36 mN/m and a drop amount of 74 ng. The results of image quality test, jetting stability test, anti-clogging test, dryability test and head cleaning test were all excellent.

EXAMPLE 5

| | |
|---|---|
| C. I. direct blue 199 | 3 parts |
| Thiodiethanol | 5 parts |
| Ethylene glycol | 5 parts |
| Polyoxyethylene polyoxypropylene block copolymer of formula (1) (oxypropylene block molecular weight: about 1,800; oxyethylene content: about 40%; average molecular weight: about 3,000) | 0.1 part |
| Pure water | 85 parts |

These components were thoroughly mixed to make a solution. The solution was then filtered through a 0.45-μm filter under pressure to prepare an ink. The ink thus prepared exhibited a viscosity of 1.7 mPas, a surface tension of 38 mN/m and a drop amount of 84 ng. The results of image quality test, jetting stability test, anti-clogging test, dryability test and head cleaning test were all excellent.

EXAMPLE 6

| | |
|---|---|
| C. I. direct red 249 | 3 parts |
| Thiodiethanol | 10 parts |
| Propylene glycol | 5 parts |
| Polyoxyethylene polyoxypropylene block copolymer of formula (1) (oxypropylene block molecular weight: about 2,000; oxyethylene content: about 40%; average molecular weight: about 3,350) | 0.05 part |
| Pure water | 80 parts |

These components were thoroughly mixed to make a solution. The solution was then filtered through a 0.45-μm filter under pressure to prepare an ink. The ink thus prepared exhibited a viscosity of 2.2 mPas, a surface tension of 38 mN/m and a drop amount of 80 ng. The results of image quality test, jetting stability test, anti-clogging test, dryability test and head cleaning test were all excellent.

EXAMPLE 7

| | |
|---|---|
| C. I. direct black 154 | 3 parts |
| 2-Mercaptoethanol | 15 parts |
| Ethylene glycol | 10 parts |
| Polyoxyethylene polyoxypropylene block copolymer of formula (1) (oxypropylene block molecular weight: about 1,000; oxyethylene content: about 35%; average molecular weight: about 1,550) | 2 parts |
| Pure water | 70 parts |

These components were thoroughly mixed to make a solution. The solution was then filtered through a 0.45-μm filter under pressure to prepare an ink. The ink thus prepared exhibited a viscosity of 3.0 mPas, a surface tension of 35 mN/m and a drop amount of 70 ng. The results of image quality test, jetting stability test, anti-clogging test, dryability test and head cleaning test were all excellent.

EXAMPLE 8

| | |
|---|---|
| C. I. food black 2 | 4 parts |
| Thiodiethanol | 15 parts |
| Diethylene glycol monobutyl ether | 10 parts |
| Polyoxyethylene polyoxypropylene block copolymer of formula (1) (oxypropylene block molecular weight: about 1,000; oxyethylene content: about 10%; average molecular weight: about 1,100) | 0.5 part |
| Pure water | 70 parts |

These components were thoroughly-mixed to make a solution. The solution was then filtered through a 0.45-μm filter under pressure to prepare an ink. The ink thus prepared exhibited a viscosity of 2.8 mPas, a surface tension of 35 mN/m and a drop amount of 76 ng. The results of image quality test, jetting stability test, anti-clogging test, dryability test and head cleaning test were all excellent.

EXAMPLE 9

| | |
|---|---|
| C. I. direct blue 199 | 3 parts |
| N-methyl-2-pyrrolidone | 15 parts |
| Thioglycerol | 10 parts |
| Polyoxyethylene polyoxypropylene block copolymer of formula (1) (oxypropylene block molecular weight: about 1,100; oxyethylene content: about 50%; average molecular weight: about 2,200) | 1.5 parts |
| Pure water | 75 parts |

These components were thoroughly mixed to make a solution. The solution was then filtered through a 0.45-μm filter under pressure to prepare an ink. The ink thus prepared exhibited a viscosity of 2.9 mPas, a surface tension of 38 mN/m and a drop amount of 72 ng. The results of image quality test, jetting stability test, anti-clogging test, dryability test and head cleaning test were all excellent.

EXAMPLE 10

| | |
|---|---|
| C. I. direct blue 86 | 3 parts |
| Glycerin | 15 parts |
| Thiodiethanol | 10 parts |
| Diethylene glycol monobutyl ether | 5 parts |
| Polyoxyethylene polyoxypropylene block copolymer of formula (1) (oxypropylene block molecular weight: about 1,800; oxyethylene content: about 20%; average molecular weight: about 2,250) | 1.5 parts |
| Pure water | 70 parts |

These components were thoroughly mixed to make a solution. The solution was then filtered through a 0.45-μm filter under pressure to prepare an ink. The ink thus prepared exhibited a viscosity of 3.3 mPas and a surface tension of 35 mN/m. An ink jet printer having a resolution of 400 dpi made on an experimental basis was used to determine the drop amount of the ink. The result was 62 ng. The results of image quality test, jetting stability test, anti-clogging test, dryability test and head cleaning test using this ink jet printer were all excellent.

EXAMPLE 11

| C. I. direct black 19 | 4 parts |
|---|---|
| Diethylene glycol | 5 parts |
| Thiodiethanol | 5 parts |
| Polyvinyl alcohol | 0.1 part |
| Polyoxyethylene polyoxypropylene block copolymer of formula (1) (oxypropylene block molecular weight: about 1,800; oxyethylene content: about 40%; average molecular weight: about 3,000) | 0.1 part |
| Pure water | 85 parts |

These components were thoroughly mixed to make a solution. The solution was then filtered through a 0.45-μm filter under pressure to prepare an ink. The ink thus prepared exhibited a viscosity of 2.0 mPas and a surface tension of 38 mN/m. An ink jet printer having a resolution of 600 dpi made on an experimental basis was used to determine the drop amount of the ink. The result was 50 ng. The results of image quality test, jetting stability test, anti-clogging test, dryability test and head cleaning test using this ink jet printer were all excellent.

EXAMPLE 12

| Carbon black | 3 parts |
|---|---|
| Thiodiethanol | 10 parts |
| Ethylene glycol | 5 parts |
| Formaldehyde condensate of sodium naphthalenesulfonate | 1 part |
| Polyoxyethylene polyoxypropylene block copolymer of formula (1) (oxypropylene block molecular weight: about 2,000; oxyethylene content: about 40%; average molecular weight: about 3,350) | 1 part |
| Pure water | 80 parts |

These components were thoroughly mixed to make a solution. The solution was then filtered through a 0.45-μm filter under pressure to prepare an ink. The ink thus prepared exhibited a viscosity of 2.3 mPas, a surface tension of 36 mN/m and a drop amount of 85 ng. The results of image quality test, jetting stability test, anti-clogging test, dryability test and head cleaning test were all excellent.

Having the foregoing constitution, the ink for ink jet recording method of the present invention causes neither nozzle clogging nor disturbance of jetting and can provide a high density uniform image which can be easily dried on paper when used in the ink jet recording method. The ink jet recording method of the present invention can provide a high density uniform image on ordinary paper.

While the invention has been described in detail and with reference to specific embodiments thereof, it will be apparent to one skilled in the art that various changes and modifications can be made therein without departing from the spirit and scope thereof.

What is claimed is:

1. An ink for ink jet recording, comprising water, a coloring material, from 0.01 to 10 wt. % of a high molecular weight surface active agent, and from 1 to 50 wt. % of a sulfur-containing alcohol, wherein said high molecular weight surface active agent is a polyoxyethylene polyoxypropylene block copolymer wherein a polyoxypropylene block of said copolymer has an average molecular weight of 900 or more.

2. The ink as in claim 1, wherein said sulfur-containing alcohol is thiodiethanol.

3. An ink jet recording method, which comprises jetting an ink at a drop amount of not more than 100 ng to effect recording, said ink comprising water, a coloring material, from 0.01 to 10 wt. % of a high molecular weight surface active agent, and from 1 to 50 wt. % of a sulfur-containing alcohol, wherein said high molecular weight surface active agent is a polyoxyethylene polyoxypropylene block copolymer wherein a polyoxypropylene block of said copolymer has an average molecular weight of 900 or more.

4. The ink as in claim 1, wherein the block copolymer has an average molecular weight of from 1,000 to 5,100.

5. The ink as in claim 1, wherein the block copolymer has an average molecular weight of from 2,000 to 5,000.

6. The ink as in claim 1, wherein the block copolymer has 5 to 60 wt. % of a polyoxyethylene block.

7. The ink as in claim 1, wherein the block copolymer has 20 to 50 wt. % of a polyoxyethylene block.

8. The ink as in claim 1, wherein the polyoxypropylene block has an average molecular weight of from 900 to 5,000.

9. The ink as in claim 1, wherein the polyoxypropylene block has an average molecular weight of from 1,500 to 2,500.

10. The ink as in claim 1, wherein the polyoxypropylene block has an average molecular weight of from 1,800 to 2,000.

11. The ink jet recording method of claim 3, wherein the block copolymer has an average molecular weight of from 1,000 to 5,100.

12. The ink let recording method of claim 5, wherein the block copolymer has an average molecular weight of from 2,000 to 5,000.

13. The ink jet recording method of claim 3, wherein the block copolymer has 5 to 60 wt. % of a polyoxyethylene block.

14. The ink jet recording method of claim 3, wherein the block copolymer has 20 to 50 wt. % of a polyoxyethylene block.

15. The ink jet recording method of claim 3, wherein the polyoxypropylene block has an average molecular weight of from 900 to 5,000.

16. The ink jet recording method of claim 3, wherein the polyoxypropylene block has an average molecular weight of from 1,500 to 2,500.

17. The ink jet recording method of claim 3, wherein the polyoxypropylene block has an average molecular weight of 1,800 to 2,000.

\* \* \* \* \*